March 11, 1930.    E. A. FORSBERG    1,749,764
CENTRIFUGAL SEPARATOR
Filed Feb. 6, 1928    5 Sheets-Sheet 1
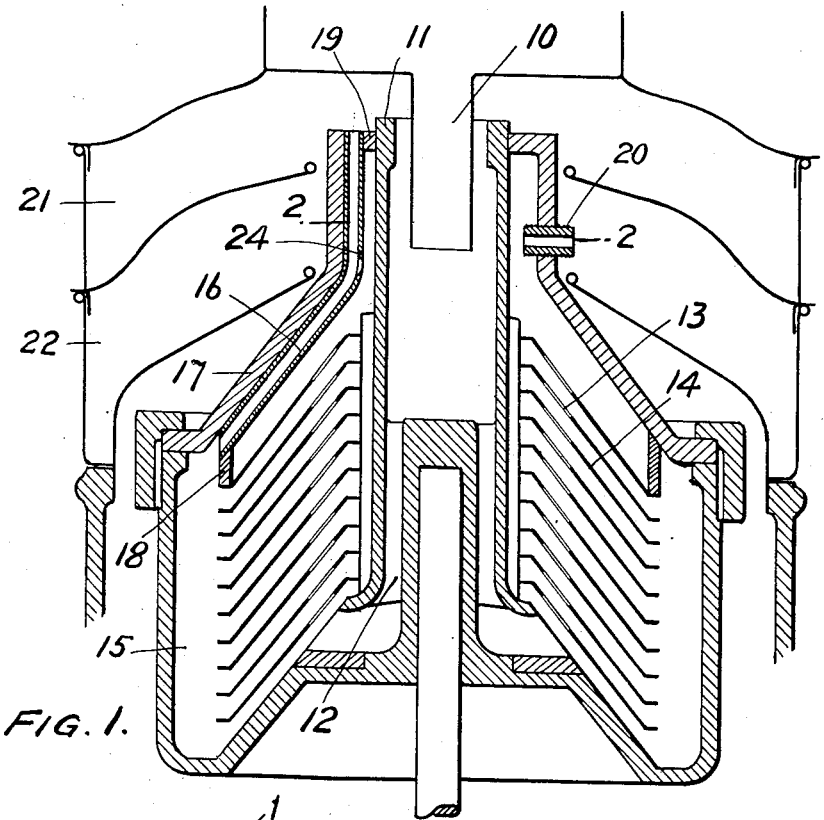
FIG. 1.
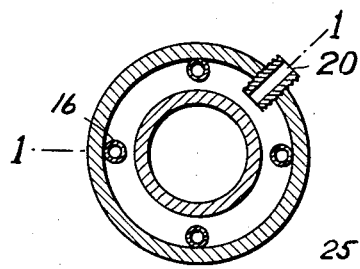
FIG. 2.
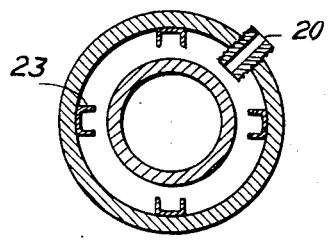
FIG. 3.
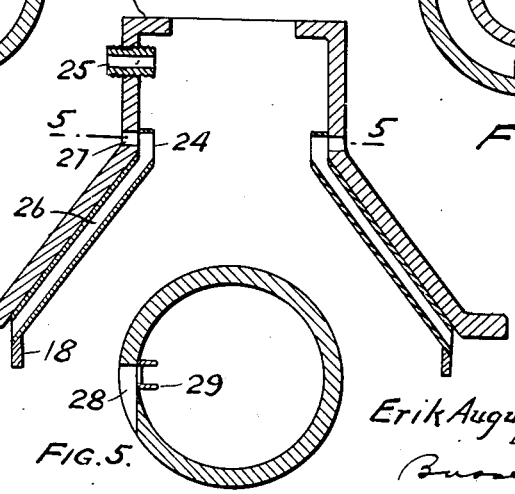
FIG. 4.
FIG. 5.
WITNESS:
INVENTOR
Erik August Forsberg
BY
ATTORNEYS.

March 11, 1930.　　　E. A. FORSBERG　　　1,749,764
CENTRIFUGAL SEPARATOR
Filed Feb. 6, 1928　　　5 Sheets-Sheet 2

WITNESS:

INVENTOR
Erik August Forsberg
BY
ATTORNEYS.

March 11, 1930.  E. A. FORSBERG  1,749,764
CENTRIFUGAL SEPARATOR
Filed Feb. 6, 1928  5 Sheets-Sheet 3

WITNESS:  INVENTOR
Erik August Forsberg
BY
ATTORNEYS.

March 11, 1930.  E. A. FORSBERG  1,749,764
CENTRIFUGAL SEPARATOR
Filed Feb. 6, 1928  5 Sheets-Sheet 4

WITNESS:
R.R. Kitchel.

INVENTOR
Erik August Forsberg
BY
Burner & Harding
ATTORNEYS.

March 11, 1930.　　　　E. A. FORSBERG　　　　1,749,764
CENTRIFUGAL SEPARATOR
Filed Feb. 6, 1928　　　5 Sheets-Sheet 5
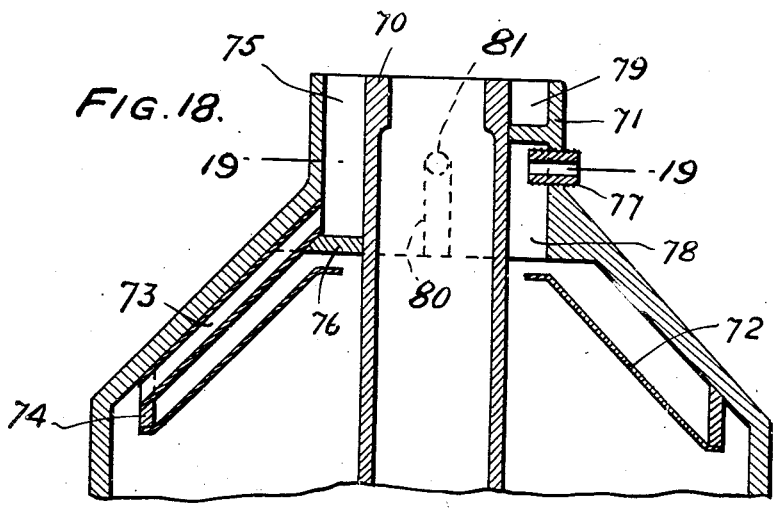
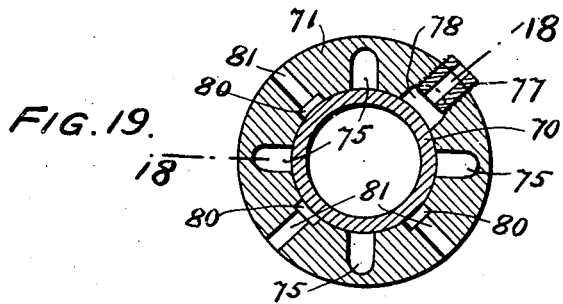
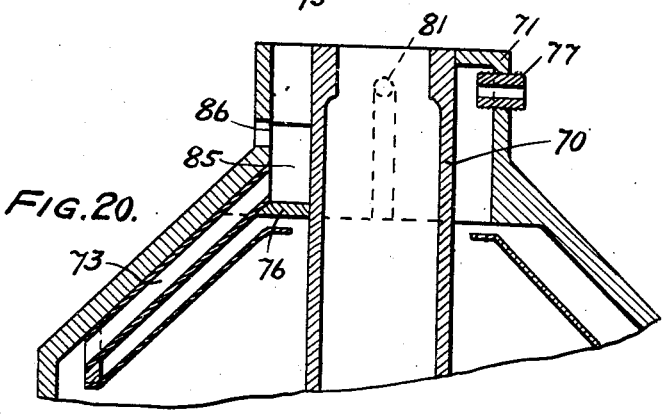
WITNESS:
INVENTOR
Erik August Forsberg
BY
ATTORNEYS.

Patented Mar. 11, 1930

1,749,764

UNITED STATES PATENT OFFICE

ERIK AUGUST FORSBERG, OF STOCKHOLM, SWEDEN, ASSIGNOR TO THE DE LAVAL SEPARATOR COMPANY, OF NEW YORK, N. Y., A CORPORATION OF NEW JERSEY

CENTRIFUGAL SEPARATOR

Application filed February 6, 1928, Serial No. 252,177, and in Sweden February 12, 1927.

In centrifugal separators intended for separating constituents of different specific gravity, one of which is a liquid or both of which are liquids, it is of importance that the discharge of the separated constituents shall be effected in a rational way.

In the first place, it is of importance that the outlets for the separated liquids shall be close to the rotation axis of the bowl, so that the loss of energy due to the kinetic energy of the overflowing liquid shall be small, and the formation of froth, splashing, etc., as far as possible reduced. Further, cleaning must present no difficulties.

If the heavier, as well as the lighter, constituent is to be continuously discharged, the greatest possible safeguard must be provided against the separated liquids again becoming mixed. Provision also usually must be made for regulating the proportion between them.

In older constructions of, for instance, milk separators, it was usual to discharge the heavier liquid through tubes extending from the proximity of the periphery inward to the neck of the bowl hood, where they were sharply bent outward in a horizontal direction, while the lighter liquid was discharged through a regulation screw located higher up in the neck. This device was open to several objections. The heavier liquid was carried relatively far away from the centre of the bowl through the horizontal parts of the tubes, and, moreover, it was difficult to clean the sharply bent tubes.

This construction was, therefore, generally abandoned and instead the heavier liquid was discharged above and outside a special top disc provided with a neck, while the lighter liquid collected inside the top disc and flowed out through one or several openings in its neck. By this arrangement the cleaning is highly facilitated; but, on the other hand, there are certain difficulties in regard to the regulation of the proportion between the liquids, which difficulties have not been entirely overcome by special constructions contrived for this purpose.

Both devices mentioned above are objectionable in that, if, which is the most usual way, the liquids are discharged at the top of the bowl, the lighter liquid will flow out above the heavier liquid. If, in this arrangement, splashing occurs, the lighter liquid has a tendency to fall down into the heavier one. Where, as in the separation of milk, the lighter liquid is the more valuable product, this involves a loss of valuable material, or, in other words, a decrease of the effectiveness of the separation. Also, air currents tending to arise on account of the ventilation action of the bowl act in the same way as the force of gravity.

The object of the present invention is to provide an outlet device in which, dependent on which of the many different embodiments of the invention may be used, the above said objections are more or less completely overcome, and at the same time a simple and relatively inexpensive construction is obtained.

In the drawings, which illustrate successive embodiments of the invention which I have devised—

Fig. 1 is a vertical section through a centrifugal separator bowl, taken on the line 1—1 of Fig. 2, embodying one form of my invention.

Fig. 2 is a cross-section on the line 2—2 of Fig. 1.

Fig. 3 is a sectional view, similar to Fig. 2, showing a modified form of outflow passage for the denser liquid.

Fig. 4 is a vertical section through the upper part of a separator bowl and shows a modification of Fig. 1 involving a reversal of the relative vertical positions of the outlets for the two separated components.

Fig. 5 is a cross-section on the line 5—5 of Fig. 4, slightly modified.

Fig. 18 is a vertical section through the upper part of a bowl containing still another embodiment of the invention, the section being taken on the line 18—18 of Fig. 19.

Fig. 19 is a cross-section on the line 19—19 of Fig. 18.

Fig. 20 is a vertical section, similar to Fig. 18, in which the relative vertical positions of the outlets for the separated components are reversed.

Figure 6:
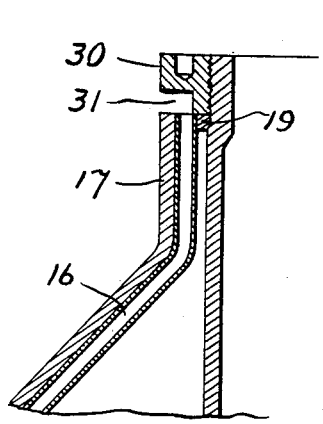
Fig. 6 is a detail view, in vertical section, of a modification adapted to a bowl with a retaining nut.

In the description, a milk separator has been chosen as an example, though the invention is of course not limited to this special type of centrifugal machines, but can also be used to advantage in separators for other purposes.

Referring first to the construction shown in Figs. 1 and 2:

The milk is fed into the bowl in the usual manner through the regulating tube 10 and passes through the channels 12 in the distributor 11 into the separating chamber of the bowl and thence upward through holes 13 in the spaced-apart discs 14. The separation takes place between the discs, the skim milk escaping outward to the annular space 15 adjacent the bowl wall and the cream being displaced inward into the annular central space surrounding the distributor. The skim milk is discharged through one or more tubes 16 extending from the space 15 up to the upper edge of the neck of the hood 17. The lower part of the tubes 16 may end in a ring 18, which has for its purpose to maintain the pile of discs in position and effect, to a certain extent, a tightening between the separator chamber and the upper part of the hood 17. The tubes 16 project through the upper flange 19 of the hood neck, and the milk discharges freely above the hood.

The cream discharge through the cream screw 20 is located further down.

The separated liquids collect, respectively, in the collecting vessels 21 and 22. As the discharge ends of the tubes 16 are not radially extended, but open, in an upward direction, inside the neck of the hood, the liquid discharges as close to the center as is suitable with regard to the hydrodynamic balance within the bowl. The loss of energy and formation of froth are thereby reduced to a minimum.

A further reduction of the energy losses can be secured by directing the tubes 16 backward in relation to the direction of rotation of the bowl. This may be effected in different known ways, of which no description is required.

The tubes 16, being without sharp bends, are not difficult to clean, as a pliant brush may be passed through the full length of a tube. However, the cleaning may be further facilitated by substituting a channel 23, opening inward (see Fig. 3), for that upper part of the tube 16 which is situated at an approximately constant distance from the axis of rotation. This channel is easy to clean, and the lower end of the tube, being straight, can be easily cleaned with a brush, which need not pass any bend.

A similar advantage may be gained by providing a hole 24 near the bend of the tube. The cleaning instrument can then be inserted through this hole without passing the bend.

As the skim milk is discharged at a higher elevation, and further away from the broad part of the bowl, than the cream, there is an absolute safeguard against the cream splashing into the skim milk. A little skim milk may splash into the cream, but this only slightly reduces the percentage of the butter fat in the lighter constituent and is not of practical importance.

In certain cases, however, it may be desirable to sacrifice the last named advantage and adhere to the arrangement now in general use, namely, the location of the cream discharge above the skim milk discharge, in order to facilitate the connection of the separator with existing plants. Such a less preferable embodiment of the invention is shown in Fig. 4. In this construction the cream screw 25 is placed above the skim milk outlet, which latter may be a hole 27 extending horizontally, or nearly horizontally, outward from the upper end of the skim milk tube 26. The skim milk outlet may be directed backward in relation to the direction of rotation of the bowl. This may be effected in different ways. For example, the material of the hood neck can be removed behind the hole in order to prevent undue losses of energy, as illustrated at 28 in Fig. 5. The tube 26 must be closed at its upper end, and, as indicated in Fig. 4, may be provided with a hole 24 directed inward in order to facilitate the cleaning. For the tube 26 may be substituted an equivalent channel 29, as shown in Fig. 5.

If, as is often the case, especially in small size separators, the different parts of the bowl are held together by a nut placed on the hood neck, it is of importance to insure against the obstruction, by this nut, of the milk outlets For this purpose, several different arrangements may be used, some of which are shown in Figs. 6–9.

Fig. 6 shows an arrangement in which the nut 30 abuts against the hood flange 19 only inside the discharge openings from tube 16, leaving an annular chamber 31, with a free outlet, above the hood flange and under and outside the nut.

Figure 7:
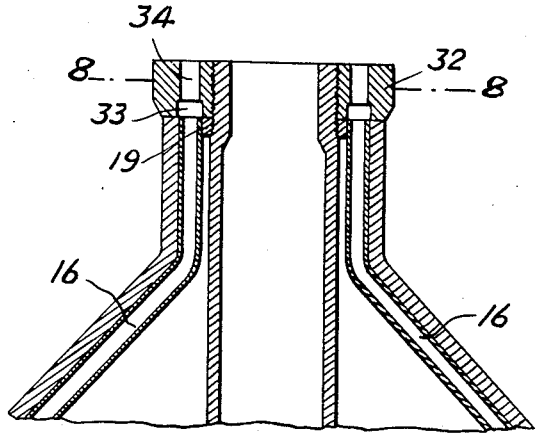
Fig. 7 is a vertical section through the upper part of a separator bowl and shows another modification adapted to a bowl with a retaining nut.
Figure 8:
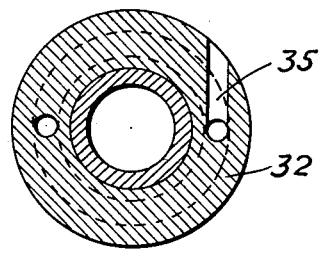
Fig. 8 is a cross-section through the bowl neck on line 8—8, Fig. 7, and shows a slight modification of the structure of Fig. 7.

Another modification is shown in Figs. 7 and 8. In these the nut, numbered 32, is provided with a channel 33 above the outlets of the tubes. The channel 33 is connected with outlets, which may be vertical, as indicated at 34 in Fig. 7, in which case they also serve as holes for the bowl spanner, or which may be horizontal, as indicated at 35 in Fig. 8.

Figure 9:
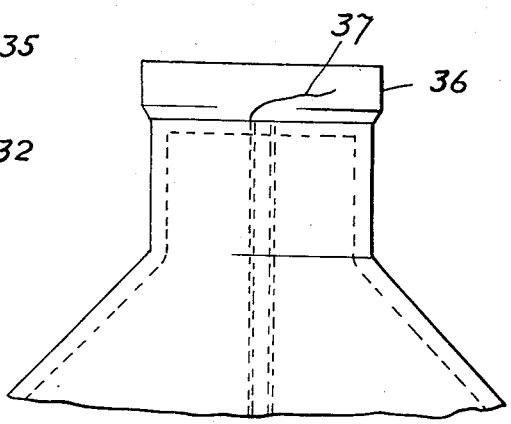
Fig. 9 is an elevation of a bowl neck provided with a modified discharge for denser liquid.

Fig. 9 shows an arrangement in which the lower side of the nut (numbered, in this figure, 36) is developed into a conveying device 37 in order to give the milk a movement backward in relation to the direction of rotation of the bowl.

While the embodiments of the invention shown in Figs. 1–9 fulfill the requirements, especially in smaller bowls, they are not wholly devoid of certain inconveniences. Especially in big bowls, where the radial extension of the tubes is considerable, it is not always easy to quite effectively clean the tubes and to make sure that the cleaning has been thorough. Further, the tubes must have a relatively considerable diameter in order to allow the flow of larger quantities of liquid. This involves the employment of tubes of a considerable vertical height, thus reducing the effective separating chamber.

The constructions hereinafter described, which are simple and inexpensive, realize more nearly perfectly the requirements of safeguarding the re-mixing of separated constituents, low power consumption, reduction of froth and splashing to a minimum, and ease of cleaning, and provide for regulating the proportion between the separated components. The constructions shown in Figs. 10–12 will be first described.

In general, the construction of the separator is the same as that of Fig. 1. The distributor 40, provided with the outlets 41, is somewhat different from distributor 11, but is of a well known form.

Figure 10:
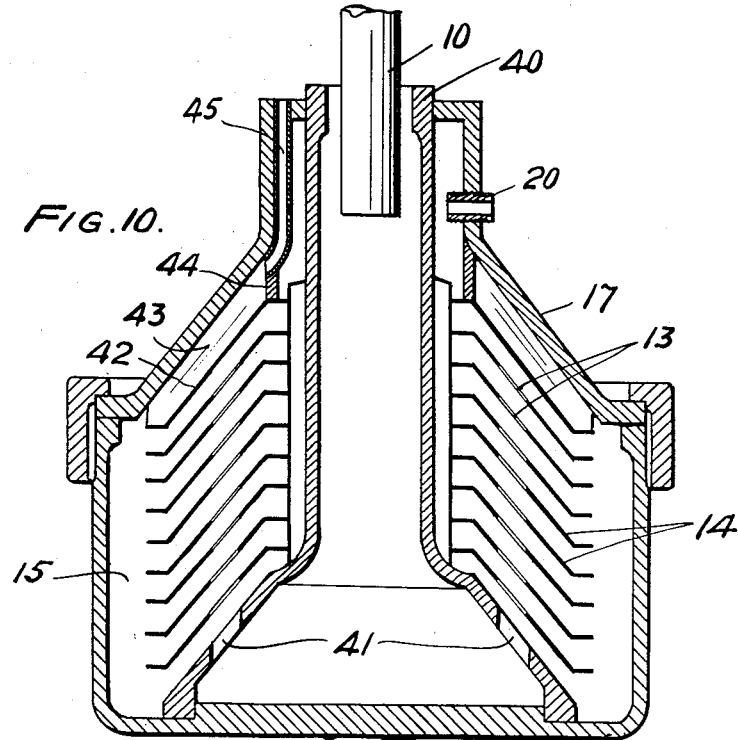
Fig. 10 is a vertical section through a bowl containing another embodiment of the invention.

The separated cream, as in the bowl of Fig. 10, collects inside the discs 14, flows up to the upper part of the bowl, and discharges through the cream screw 20 placed in the neck 17 of the hood. This screw is shown as positioned in the lower part of the hood neck, thus safeguarding against the cream splashing into the skim milk.

The skim milk flows out to the space 15 outside the discs, and flows thence towards the central part of the bowl between the hood 17 and the top disc 42. The top disc, as is usual, is unprovided with a feed hole 13, but differs from top discs heretofore used in that it is not provided with a neck but has the same shape as the other discs. The top disc is preferably made removable, in a known manner, to facilitate cleaning, but it may be secured to the hood without making cleaning as difficult as if closed tubes, such as 16, are provided.

Figures 11, 12:
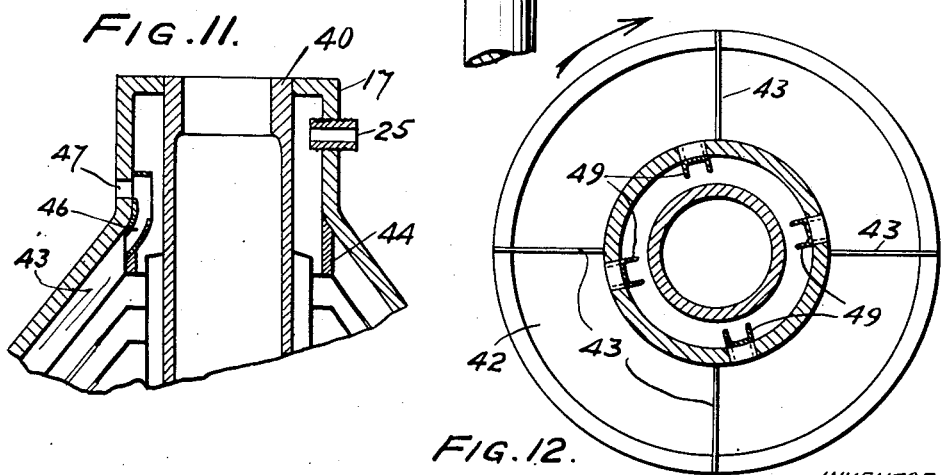
Fig. 11 is a vertical section through the upper part of a separator bowl containing a modification of Fig. 10 in which the vertical positions of the outlets for the two components are reversed.
Fig. 12 is a horizontal sectional view of another modified construction.

Between the top disc 42 and hood 17 are ribs or wings 43, which may be carried either by the top disc 42 or by the hood 17. The wings 43 begin, preferably, though not necessarily, at the outer edge of the top disc and extend a longer or shorter way toward the center. In the embodiment shown in Fig. 10, the inner ends of the wings abut against a ring 44, effecting at least partial tightening between the hood 17 and the top disc 42. Tubes 45 extend from this ring upward to the upper edge of the neck of the hood 17, where they open in an upward direction. The upper ends of the tubes can, of course, be constructed and arranged in other ways, for example, as shown in Figs. 3–8. They can also, in regard to that part which is situated at a constant distance from the rotation axis of the bowl, be developed into channels opening inward, as shown in Fig. 3. The tubes may also, whether or not they are developed into open channels, be closed at their upper ends and may each be provided with an outlet at the side, as shown in Fig. 11. They may also be directed backward in various ways, as, for example, shown in Fig. 5.

In Fig. 11, the tubes (numbered in this figure 46) extend up within the bowl neck but a short distance and communicate with a hole 47 in said neck; the regulating screw 25 being located at a higher elevation, as in Fig. 4.

The inner ends of the ribs 43 need not align with the lower ends of the tubes 45. If they are arranged to overlap a short distance, the rings 44 may be omitted.

It is practicable, as shown in Fig. 12, to locate the inlets to the tubes (or, as shown, channels 49) adjacent, or near, wings 43. The wings should be in front of (relative to the direction of rotation) the respective inlets, because the pressure of the liquid is greatest at this location and consequently the flow to the tubes occurs most easily.

The denser liquid flowing inwardly in the separating chamber between the hood 17 and the top disc 42 is conveyed, in the usual way, by the wings 43, so that the centripetal flow can proceed freely. The liquid flows into the tubes 45 or 46, which conduct it further inward or toward the center, and thence to the outlet. The lighter liquid collected in the proximity of the central part of the bowl forms a paraboloid, or, on account of the great speed of rotation, approximately a cylinder, whose inner wall is determined by the position of the cream screw 20 or 25. The layer of lighter liquid has a certain thickness, depending upon several circumstances, but being in practice rather unimportant. If the passage from the wings 43 to the tubes 45 or 46 is placed so far out that it is with certainty situated outside the layer of the lighter liquid, there is no danger of the lighter liquid becoming re-mixed within the bowl with the heavier component. A safeguard against these liquids again becoming mixed outside the bowl is obtained by suitably, in known manner, arranging the outlet openings in proper relative positions.

While it is usually preferable to use a plurality of tubes 45 or 46, and to arrange them symmetrically, it is possible, in small separators, to provide a single tube.

By the arrangements described in Figs. 10-12, the great advantage is gained that the heavier liquid can be conducted near toward the center and discharged with the smallest possible energy consumption and froth formation, and, at the same time, flows the greater part of the way through wide, easily cleaned passages between the hood of the bowl and a preferable removable top disc; while near the center, where the layer of lighter liquid is formed, the heavier liquid flows through more or less closed channels. These channels may be, therefore, of very short length and may be easily cleaned and inspected.

The devices of Figs. 10-12 thus combine the desirable advantages of the old top disc with the advantages of the tube discharge devices of Figs. 1-9.

While the devices shown in Figs. 1-9 and in Figs. 10-12 are entirely practicable, still, if a large number of tubes are employed, there are necessarily a great many channels in the interior of the hood neck, which makes their cleaning less easy and somewhat complicates the manufacture.

The embodiments of the invention shown in Figs. 13-17 secure the advantages of further simplicity of construction and further ease of cleaning.

In these figures, embodiments are shown wherein, as in Figs. 10-12, the heavier liquid, in its flow toward the discharge, passes between the hood and a top disc and is subjected to the action of radial wings or ribs. The constructions may be, however, modified, in accordance with Figs. 1-9, wherein the heavier liquid outflows from the peripheral part of the bowl through tubes.

Figure 13:
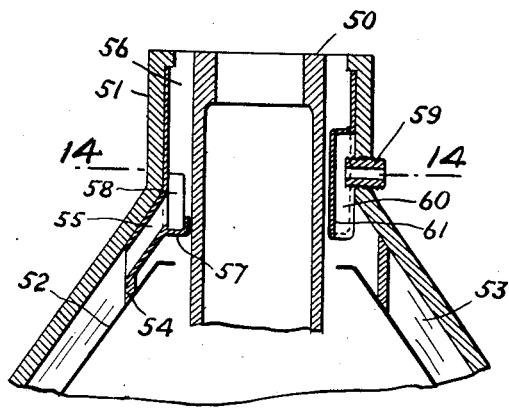
Fig. 13 is a vertical section through the upper part of a bowl containing another embodiment of the invention, the section being taken on the line 13—13 of Fig. 14.
Figure 15:
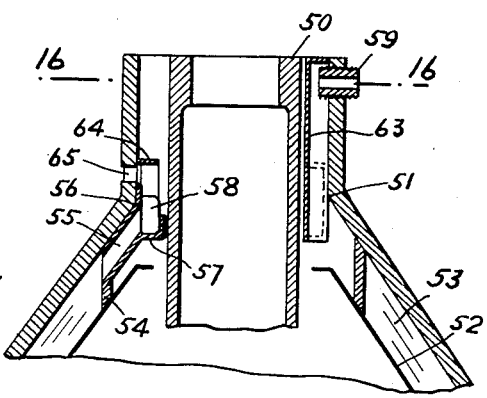
Figs. 15 and 16 are views, similar to Figs. 13 and 14 respectively, in which the relative vertical positions of the outlets for the separated components are reversed.
Figure 14:
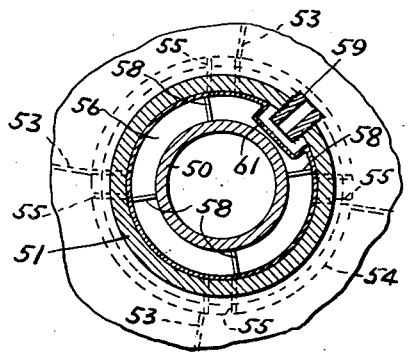
Fig. 14 is a cross-section on the line 14—14 of Fig. 13.

In Figs. 13 and 14, 50 is the distributor, which receives the liquid to be separated and conveys it to the separating chamber. 51 is the hood and 52 the top disc. Between the hood 51 and the disc 52 are ribs or wings 53. In the chamber between the hood 51 and the disc 52 is arranged a ring 54, which effects at least partial tightening between said parts. In the inner part of the chamber between the hood 51 and the disc 52 are provided tubes 55, which conduct the heavier liquid further toward the center. These tubes open into a chamber 56, situated mainly in the neck of the hood 51, in which chamber the liquid collects. The chamber 56 is provided with a bottom 57, which prevents the heavier liquid collected in the chamber from spreading to the central part of the bowl. It is also practicable to arrange conveyors 58 in the chamber 56, thus giving the liquid a speed over the whole radial extension of the chamber that corresponds to the speed of the bowl, whereby eddies and other disturbances are prevented. The bottom 57 can be arranged to effect at least partial tightening against the distributor 50, and can also be provided with a flange bent upwards, as shown in Figs. 13 and 15, for the purpose of further insuring against the heavier liquid escaping inwardly. The upper end of the chamber 56 may be wholly open, as shown in Fig. 13.

The lighter liquid leaves the bowl through a regulating screw 59, which is suitably placed in the lower part of the hood neck. This regulating screw is arranged in a niche-shaped recess in the chamber 56, so that the lighter liquid can freely flow up to the screw but cannot enter the chamber 56. This recess opens downward, but is shut off from the chamber 56 by a wall 60. On the inside the recess may be open or may be closed by a wall 61. The last mentioned arrangement gives greater safety against the liquids becoming re-mixed, but is not so suitable from a cleaning point of view. If there is no wall 61, the wall 60 is preferably extended toward the distributor 50, so that at least partial tightening can be obtained.

Figure 16:
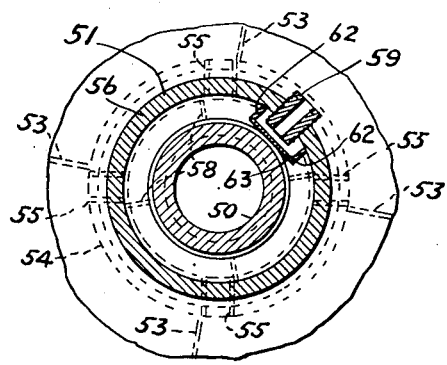

If it is desired to discharge the lighter liquid above the heavier liquid, which is the usual practice, the chamber 56 must be shut off by a cover and the recess extended upward to the desired height. This arrangement is shown in Figs. 15 and 16, in which the end walls of the recess are numbered 62 and the inside wall 63. The chamber 56 is provided with a cover 64, which prevents the heavier liquid that collects in the chamber from rising higher than desired in the hood neck. At the side of the chamber 56 there is an outlet 65, through which the liquid discharges, and adjacent which the material of the hood wall is suitably cut away in a manner similar to the structure shown in Fig. 5.

The lighter liquid discharges through the screw 59, which is arranged in the described channel or niche extending over the cover 64 and bounded by the walls 62 and 63.

In the embodiments of the invention preceding Fig. 13, the heavier liquid, at least during the latter part of its movement towards the center, is conducted through tubes. This arrangement involves, however, an objection, which, under certain circumstances, may become troublesome. Thus, even if a ring like 44 is employed, it may not be so completely tightened between the hood and the top disc as to insure against some penetration of the heavier liquid into the central part of the bowl, where it will dilute the separated lighter liquid. It is true that this dilution as a rule can be kept within harmless amounts by suitably dimensioning the parts, but in such cases, where great concentration is required, it is often difficult to obtain the necessary control over the movement of the heavier liquid without sacrificing other advantages. The tubes 55 act as conveyors of any heavier liquid which has possibly collected in the chamber between the hood and the discs within the radial area of the tubes 55. It is a generally known and easily explained phenomenon that the radial movement of a liquid in a rapidly revolving vessel is highly facilitated by conveyors, whereas, if conveyors are not provided, radial movement takes place only slowly and with difficulty. If, therefore, it can be so arranged that liquid, tending to flow another way than the one intended, will have no conveyance, a good safeguard against such flow will be attained.

Figure 17:
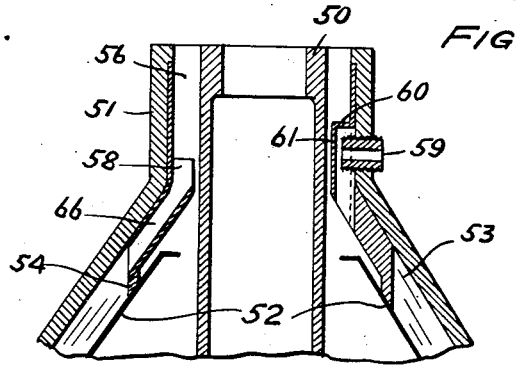
Fig. 17 is a vertical section, similar to Fig. 13, of a slight modification.

The construction of Fig. 17 embodies an arrangement adapted to provide such a safeguard. The tubes (therein numbered 66) are not spaced-apart individual tubes with interspaces, but are channels in a solid plate with an even under side. If the heavier liquid in part tends to pass under this plate instead of flowing through the channels in the plate, the liquid will enter into a chamber provided with no conveying means and wherein the centripetal movement can take place only very slowly, and for this reason the quantity of liquid which can penetrate into the central part of the bowl is so slight as to be of no practical importance.

The channels 66 may of course be given a considerable width, so that only comparatively thin conveying walls remain. The passages nearest to the center are thus as capacious as the space between the wings of a top disc of the type usually employed, whereby the resistance to movement in the desired path of flow is cut down to a minimum.

Still further simplified and improved embodiments of the invention are shown in Figs. 18–20. These embodiments, which on the whole are preferred, still further facilitate the cleaning of the flow passages and insure, under all conditions, an ample flow of liquid. This facilitation of cleaning is due, in the preferred embodiments, to entire avoidance of any structure which produces nooks and corners that are difficult to reach and which necessitate production by castings, whereby it is difficult to obtain smooth and even surfaces that are easy to clean. In Figs. 18–20, 70 is the distributor through which the liquid is supplied. 71 is the hood and 72 the top disc. Between the hood 71 and the top disc 72 are arranged one or more tubes 73 which conduct the heavier liquid from the bowl's periphery towards its center. The tubes F open at their outer ends through a ring 74, which effects at least partial tightening against the disc 72. In Fig. 18 the tubes are shown extended to the outer periphery of the disc 72. This is not, however, necessary, but the tubes 73 can be shortened, and arranged as shown in Figs. 13–17, and wings 53 provided between the hood and disc. In the neck of the hood are arranged channels 75, into which the inner ends of the tubes 73 open. The channels 75 may either (as shown in the drawing) be machined out in the material of the hood, or (as is preferable in certain cases in practice) be arranged in a special inner bushing fixed to the neck of the hood. In either case, each channel 75 is provided with a bottom wall 76 that prevents the separated lighter liquid from entering the channel 75. The bottom 76 is extended towards the distributor 70 so that at least partial tightening against it is effected. The material between the channels 75 is also extended inward to effect an at least partial tightening against the distributor 70. The extension and tightening are important, because they make it possible to place the outlets for the liquids near the center line of the bowl, and thus decrease the speed of the discharging liquids. Especially the heavier liquid flows with considerable speed through the tubes 73, and therefore it has, at the entrance to the channels 75, a tendency to continue toward the central part of the bowl, whereby a certain surging occurs at this place. If there is a considerable play between the walls of a channel 75 and the distributor 70, part of the liquid, because of this surging, overflows the edges and enters the central part of the bowl, where it dilutes the separated lighter component. By eliminating or substantially reducing this play, leakage is avoided or is cut down to practically harmless amounts. The channels 75 may, as shown in Fig. 18, open upward, or the discharge therefrom may be directed backward with relation to the direction of rotation of the bowl in the way hereinbefore described, or any other suitable discharging means may be provided.

The lighter liquid discharges through one or more regulating screws 77, which, according to Fig. 18, are placed in the lower part of the hood neck. The screw 77 is arranged in a channel 78, which opens toward the center of the bowl, so that the lighter liquid freely flows upward to the screw.

For effecting a saving in weight, recesses 79 may be arranged between the channels 75 without connection either with the channels 75 or 78.

Though, by extending the material of the hood to tighten against the distributor 70, a great safeguard is obtained against the lighter liquid entering the channels 75, nevertheless, if these channels are not located relatively far from the center, which would increase power consumption and formation of froth, the danger exists that, if the regulating screw 77 is screwed far in, and if, at the same time, the bowl, on account of some disturbance in the mass distribution, revolves around on axis deviating somewhat from the axis of symmetry, the lighter liquid, in some place, will rest against the distributor 70 with a certain overpressure, so that leakage to the channels 75 may result.

In order to prevent this, small drain channels 80 may be arranged between the channels 75. These channels 80, at their lower ends, open adjacent distributor 70, and at their upper ends communicate with outlet holes 81, situated in the same or about the same plane as the regulating screw 77. The channels 80 should be given a small radial depth, so that they will commence to function only when there is a risk that the lighter liquid should take an unpermitted path. If, at some point of the periphery, the lighter liquid then should move dangerously near to the distributor 70, it will flow out through some channel 80 and hole 81, and discharge, together with the liquid flowing through the regulating screw 77, to the proper receiving vessel.

The device shown in Figs. 18 and 19 is arranged to discharge the heavier liquid at a higher elevation than the discharge from the lighter liquid. If it is desired to discharge the lighter liquid above the heavier liquid, the device may be easily modified to effect this mode of operation. One such modification is shown in Fig. 20. In this figure, the channels 85 (corresponding to channels 75 in Figs. 18 and 19) are closed at their upper ends and are provided with outlet holes 86 on the side. The material of the hood neck is preferably cut away as shown in Fig. 5.

In the embodiments of the invention shown in Figs. 18–20, all surfaces that are to tighten against the distributor 70 can be easily accurately machined by turning or boring and reaming. All of the channels 75, 85, 78 and 80 can be manufactured by milling or shaping. The flow passages can thus be made with even, smooth and accurately dimensioned surfaces, which much facilitate cleaning and insure a reliable operation of the separator. In order to further facilitate manufacturing and cleaning, it is also suitable to so dimension the tubes 73 that, when extended upward to the upper edge of the hood neck, they shall run free from the sides of the neck up through its central hole.

Having now fully described my invention, what I claim and desire to protect by Letters Patent is:

1. The combination with a centrifugal separator bowl and the hood thereof, and a distributor adapted to discharge the mixture to be separated into the separating chamber of the bowl, of means providing outflow passages for the heavier and lighter components respectively, the first passage being in communication with the peripheral part of the bowl and the second passage being in communication with the part of the bowl relatively near its axis, an upstanding neck on the hood, said passages extending within said neck and the first passage extending substantially above the discharge of the second passage, and a hollow regulating screw projecting through said neck and providing a discharge for the second passage and extending substantially further from the axis of the bowl than the discharge end of the first passage.

2. The combination with a centrifugal separator bowl and the hood thereof provided with an upstanding neck, and a centrally disposed distributor extending downward through the hood neck and adapted to discharge the mixture to be separated into the separating chamber of the bowl, of a top disc in the bowl and spaced from the hood, a conduit for the heavier separated component whose lower receiving end extends toward and is in communication with the peripheral part of the bowl and whose upper discharge portion end is positioned relatively close to the distributor, and a ring between the hood and the top disc, the part of said conduit that opens toward the periphery of the bowl extending through said ring.

3. The combination with a centrifugal separator bowl and the hood thereof provided with an upstanding neck, and a centrally disposed distributor extending downward through the hood neck and adapted to discharge the mixture to be separated into the separating chamber of the bowl, of a conduit for the heavier separated component whose lower receiving end is in communication with the peripheral part of the bowl and whose upper discharge portion is positioned relatively close to the axis of the bowl adjacent the distributor, and a conduit for the lighter separated component whose lower receiving end is in communication with the central part of the bowl and which also extends up outside the distributor and is provided with a wall separating it from the conduit for the heavier separated component.

4. The combination with a centrifugal separator bowl and the hood thereof provided with an upstanding neck, and a centrally disposed distributor extending downward through hood neck and adapted to discharge the mixture to be separated into the separating chamber of the bowl, of a conduit for the heavier separated component comprising a channel in communication with the peripheral part of the bowl and extending inward toward the axis of the bowl and a channel within the hood neck into which the first named channel opens, the channel within the hood neck having side walls and a bottom extending substantially to the distributor.

5. The combination with a centrifugal separator bowl and the hood thereof provided with an upstanding neck, and a centrally disposed distributor extending downward through the hood neck and adapted to discharge the mixture to be separated into the separating chamber of the bowl, of a conduit for the heavier separated component comprising a channel in communication with the peripheral part of the bowl and extending inward toward the axis of the bowl and a channel within the hood neck into which the first named channel opens, the channel within the hood neck having side walls and a bottom extending substantially to the distributor, and a conduit for the lighter separated component whose lower end is in communication with the central part of the separating chamber of the bowl and which extends up within the hood neck and has side walls extending substantially to the distributor and is spaced in a circumferential direction from the channel within the hood neck for the heavier separated component.

6. The combination with a centrifugal separator bowl and the hood thereof provided with an upstanding neck, and a centrally disposed distributor extending downward through the hood neck and adapted to discharge the mixture to be separated into the separating chamber of the bowl, of a conduit for the heavier separated component comprising a channel in communication with the peripheral part of the bowl and extending inward toward the axis of the bowl and a' channel within the hood neck into which the first named channel opens, the channel within the hood neck having side walls and a bottom extending substantially to the distributor, a conduit for the lighter separated component whose lower end is in communication with the central part of the separating chamber of the bowl and which extends up within the hood neck and has side walls extending substantially to the distributor, a regulating screw extending into the last named conduit, and another channel within the hood neck adjacent to the distributor and communicating with the separating space of the bowl adjacent to the distributor and of a radial depth that is small compared to the radial depth of the channel within the hood neck for the heavier separated component, said shallow channel having an outlet at a level approximating that of said regulating screw.

7. The combination with a centrifugal separator bowl and the hood thereof provided with an upstanding neck, and a distributor adapted to discharge the mixture to be separated into the separating chamber of the bowl, of means providing outflow passages for the heavier and lighter ingredients respectively, the first passage being in communication with the peripheral part of the bowl and the second passage being in communication with the part of the bowl relatively near its axis, both said passages extending vertically upward between said distributor and said neck along and adjacent said neck.

8. The combination with a centrifugal separator bowl and the hood thereof provided with an upstanding neck, and a distributor adapted to discharge the mixture to be separated into the separating chamber of the bowl, of means providing outflow passages for the heavier and lighter ingredients respectively, the first passage being in communication with the peripheral part of the bowl and the second passage being in communication with the part of the bowl relatively near its axis, both said passages extending vertically upward between said distributor and said neck along and adjacent said neck, the first passage having a discharge end substantially above the level of the discharge of the second passage.

9. The combination with a centrifugal separator bowl and the hood thereof provided with an upstanding neck, and a distributor adapted to discharge the mixture to be separated into the separating chamber of the bowl, of means providing outflow passages for the heavier and lighter ingredients respectively, the first passage being in communication with the peripheral part of the bowl and the second passage being in communication with the part of the bowl relatively near its axis, both said passages extending vertically upward between said distributor and said neck along and adjacent said neck, a hollow regulating screw extending through the bowl neck into the second passage, the first passage having a discharge end substantially above the level of the regulating screw.

10. The combination with a centrifugal separator bowl and the hood thereof provided with an upstanding neck, and a distributor adapted to discharge the mixture to be separated into the separating chamber of the bowl, of means providing outflow passages for the heavier and lighter ingredients respectively, the first passage being in communication with the peripheral part of the bowl and the second passage being in communication with the part of the bowl relatively near its axis, both said passages extending vertically upward between said distributor and said neck along and adjacent said distributor.

11. The combination with a centrifugal separator bowl and the hood thereof provided with an upstanding neck, and a distributor adapted to discharge the mixture to be separated into the separating chamber of the bowl, of means providing outflow passages for the heavier and lighter ingredients respectively, the first passage being in communication with the peripheral part of the bowl and the second passage being in communication with the part of the bowl relatively near its axis, both said passages extending vertically upward between said distributor and said neck, the outer vertically extending walls of both passages being at substantially equal distances from the axis of the bowl.

12. The combination with a centrifugal separator bowl and a distributor surrounding the bowl axis and adapted to discharge the mixture to be separated into the separating chamber of the bowl, of a bowl hood having an upstanding neck surrounding the distributor and spaced therefrom a distance, measured radially, less than the radius of the distributor, and means providing outflow passages for the heavier and lighter ingredient respectively, the first passage being in communication with the peripheral part of the bowl and extending vertically upward within the space between the hood neck and distributor, the second passage being in communication with the part of the bowl relatively near its axis and extending vertically upward within the space between the hood neck and distributor, the outer wall of the vertically extending part of the first passage being substantially as close as the outer wall of the vertically extending part of the second passage to said axis.

13. The combination with a centrifugal separator bowl and a distributor surrounding the bowl axis and adapted to discharge the mixture to be separated into the separating chamber of the bowl, of a bowl hood having an upstanding neck surrounding the distributor and spaced therefrom a distance, measured radially, less than the radius of the distributor, and means providing outflow passages for the heavier and lighter ingredients respectively, the first passage being in communication with the peripheral part of the bowl and extending vertically upward within the space between the hood neck and distributor, the second passage being in communication with the part of the bowl relatively near its axis and extending vertically upward within the space between the hood neck and distributor, the outer wall of the vertically extending part of the first passage being substantially as close as the outer wall of the vertically extending part of the second passage to said axis and provided with a discharge end substantially above the level of the discharge end of the second passage.

In testimony of which invention, I have hereunto set my hand at Stockholm, Sweden, on this 19th day of January, 1928.

ERIK AUGUST FORSBERG.